United States Patent

[11] 3,583,785

| [72] | Inventor | Jack B. Boardman<br>Chicago, Ill. |
|------|----------|---------------------------------|
| [21] | Appl. No. | 854,488 |
| [22] | Filed | Sept. 2, 1969 |
| [45] | Patented | June 8, 1971 |
| [73] | Assignee | Bell & Howell Company<br>Chicago, Ill. |

[54] POSITIVE OPTICAL SYSTEM
1 Claim, 3 Drawing Figs.

[52] U.S. Cl. .................................................. 350/8,
350/54
[51] Int. Cl. .......................................... G02b 21/00,
G02b 23/00
[50] Field of Search ........................................ 350/8, 54,
189

[56] References Cited
UNITED STATES PATENTS
2,955,512  10/1960  Kollmorgen et al. ......... 350/54X
FOREIGN PATENTS
606,065  8/1948  Great Britain ................ 350/189

*Primary Examiner*—David Schonberg
*Assistant Examiner*—Toby H. Kusmer
*Attorney*—William F. Pinsak ABSTRACT: A positive optical system having four optical elements, each of which is aspheric and arranged in pairs with the elements of the pairs being of the same biconvex configuration.

PATENTED JUN 8 1971        3,583,785
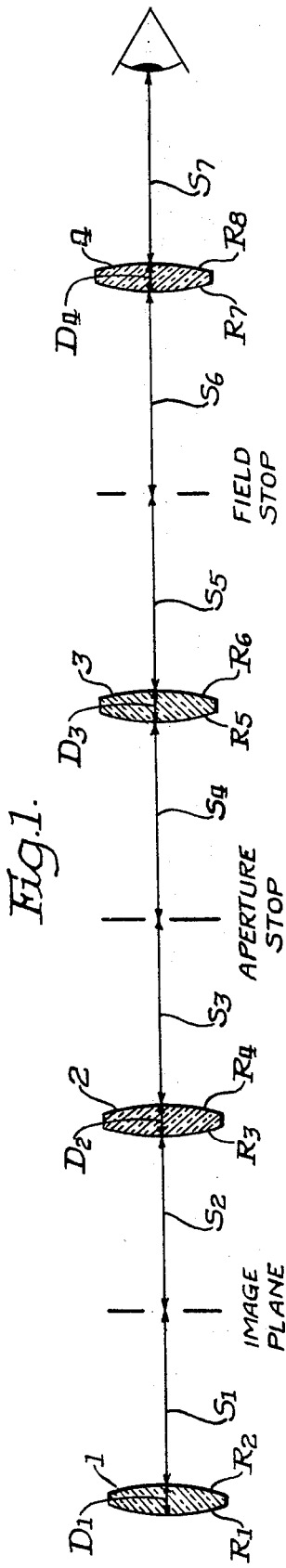
Fig.1.
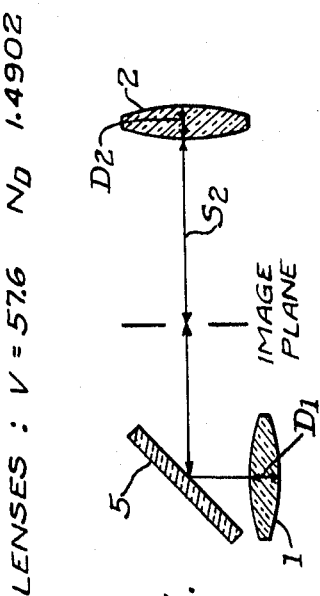
Fig.3.
Fig.2.
| LENS | RADII (INCHES) | THICKNESSES (INCHES) | SPACINGS (INCHES) |
|---|---|---|---|
| 1 | $R_1, R_2 \rangle = +.707$ | $D_1 = .110$ | $S_1 = .6996$ |
| 2 | $R_3, R_4 (A = -.600)$ | $D_2 = .110$ | $S_2 = .6996$ |
| 3 | $R_5, R_6 \rangle = +.807$ | $D_3 = .120$ | $S_3 = .7450$ |
| 4 | $R_7, R_8 (A = -.405)$ | $D_4 = .120$ | $S_4 = .7900$ |
|   |   |   | $S_5 = .7995$ |
|   |   |   | $S_6 = .7995 \pm .100$ ADJUSTMENT |
|   |   |   | $S_7 = .7700$ EYE RELIEF |
ALL LENSES: $V = 57.6$    $N_D$ 1.4902
Inventor:
Jack B. Boardman.
By *William F. Smith* Atty

POSITIVE OPTICAL SYSTEM

This invention relates to an optical system for use primarily as a viewfinder for a camera, and relates particularly to a positive system in which each of the elements are of aspheric form.

Optical systems having one or more aspheric elements have been designed in the past. Most of these systems have used aspheric elements in addition to spherical elements. In such arrangements, the systems have been relatively expensive compared to totally spherical systems. The systems have generally required that each element be distinct from every other element. Therefore, manufacture of the elements was more complex and the assembly thereof more time consuming and complex, and thus more expensive.

A feature of this invention is to provide a simplified optical system which is efficient yet economical. The economy is obtained in that the economically manufactured elements are easily assembled. Since a single element configuration is used in more than one position, duplication of elements reduces the number of different elements which must be manufactured, and subsequently selected for assembly into the system. Further, the use solely of aspheric elements provides for better optical correction while using elements formed by mass production methods such as by molding.

Objects and advantages of the invention will become apparent from detailed description which follows when taken in conjunction with the accompanying drawings in which:

FIG. 1 is a sectional view of an optical system embodying the present invention;

FIG. 2 is a table of optical values for the optical system of FIG. 1; and

FIG. 3 is a sectional view of the forward elements of the optical system of FIG. 1 when arranged for a reflex viewing system.

As seen in FIG. 1, an optical system is shown for use as a viewfinder of a camera. The arrangement of the elements, configured as hereinafter described, provides for a positive image of a scene being viewed. By the selection of elements, the scene can be viewed directly using the element at the entrance end of the system as an objective, or indirectly as by a reflex system as shown in FIG. 3. In the indirect system, rays from the scene enter by a main optical system of a camera and pass through the objective which functions as a relay element.

The optical system has four symmetrical biconvex elements with aspheric surfaces. The elements are paired with the forward pair being respectively the objective 1 and a first erector 2, and the rearward pair being respectively a second erector 3 and an eye lens 4. The elements of each pair are of identical configuration as defined in the table comprising FIG. 2. By this design, duplicate elements can be more rapidly selected for assembly into the total optical system.

The modified optical system shown in FIG. 3 uses the same optical element 1 as the relay lens. After rays are received by this element, the rays are deflected by a mirror 5 rearwardly through the remainder of the system toward the viewer.

Within the optical systems, the elements are spaced such that the rays at an image plane are between the objective 1 and the first erector 2, the aperture stop of the system is between the first erector 2 and the second erector 3, and a field stop is between the second erector 3 and an eye lens 4. The eye lens is supported in an adjustable member (not shown) to permit required adjustments to accommodate for variations due to the eyes of particular users. By a construction of the eye lens support, the users eye is maintained a minimum distance away from the eye lens.

The optical values for the optical system of FIG. 1 (and FIG. 3) are as follows:

| Lens | Radii (in.) | | Thicknesses (in.) | Spacings (in.) |
|---|---|---|---|---|
| 1 | $R_1, R_2$ | $\}=+.707$ | $D_1$ $\}=.110$ | $S_1=.6996$ $S_2=.6996$ |
| 2 | $R_3, R_4$ | $\}(A=-.600)$ | $D_2$ | $S_3=.7450$ |
| 3 | $R_5, R_6$ | $\}=+.807$ | $D_3$ $\}=+.120$ | $S_4=.7900$ $S_5=.7995$ $S_6=.7995\pm$ |
| 4 | $R_7, R_8$ | $\}(A=-.405)$ | $D_4$ | |
| | | | | 100 adjustment $S_7=.7700$ Eye Relief |

In the above table, the first column lists the lens elements numerically starting at the ray entrance side of the system. Each of the elements has the same dispersive index and refractive index being formed, for example, by molding from an acrylic plastic material. The second column lists the respective basic radii and the aspheric term $A$ superimposed thereon. The aspheric term is derived by formula $$Z = R - R\sqrt{1 - \frac{H^2}{R^2} - \frac{2AH^4}{R}}$$

where $R$ is the radius of the surface of the element; $H$ is the Cartesian coordinate of a point on the surface referred in a vertical axis; $Z$ is the Cartesian coordinate of a point on the surface referred in a horizontal axis. The third column lists the thickness of the respective elements. The fourth column lists the axial spacings between the respective elements and the minimum spacing to the users eye. Elements 1 and 2 each have an effective focal length =0.7401 in., and elements 3 and 4 =0.8438 in.

I claim:

1. A positive optical system having substantially the following specification:

| Lens | Radii (in.) | | Thicknesses (in.) | Spacings (in.) |
|---|---|---|---|---|
| 1 | $R_1, R_2$ | $\}=+.707$ | $D_1$ $\}=.110$ | $S_1=.6996$ $S_2=.6996$ |
| 2 | $R_3, R_4$ | $\}(A=-.600)$ | $D_2$ | $S_3=.7450$ |
| 3 | $R_5, R_6$ | $\}=+.807$ | $D_3$ $\}=.120$ | $S_4=.7900$ $S_5=.7995$ $S_6=.7995\pm$ |
| 4 | $R, R_8$ | $\}(A=-.405)$ | $D_4$ | |
| | | | | 100 adjustment $S=.7700$ Eye relief |

ALL LENSES: V=57.6   $N_D$=1.4902 wherein the first column lists the lens elements numerically starting at the ray entrance side of the system which elements each have the same dispersive index and refractive index; the second column lists the respective basic radii $R_1$ to $R_8$ and the aspheric term $A$ superimposed thereon; the third column lists the thickness $D_1$ to $D_4$ of the respective elements; and the fourth column lists the axial spacings $S_1$ to $S_7$ between the respective elements, the + values of the radii indicate surfaces which are convex, and wherein $V$ is the abbe number and $N_D$ is the index of refraction of the elements.